(No Model.)  2 Sheets—Sheet 1.

J. H. FOOTE.
THREAD CUTTING ATTACHMENT FOR SEWING MACHINES.

No. 265,313.  Patented Oct. 3, 1882.

WITNESSES:  INVENTOR:

(No Model.) 2 Sheets—Sheet 2.
J. H. FOOTE.
THREAD CUTTING ATTACHMENT FOR SEWING MACHINES.
No. 265,313. Patented Oct. 3, 1882.
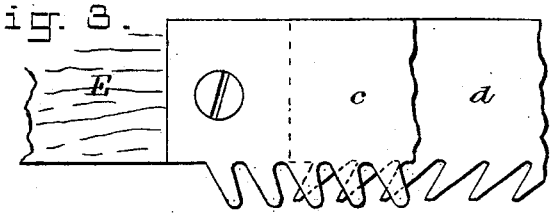
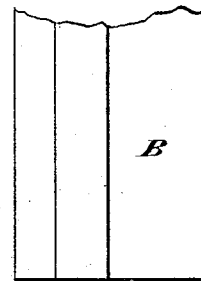
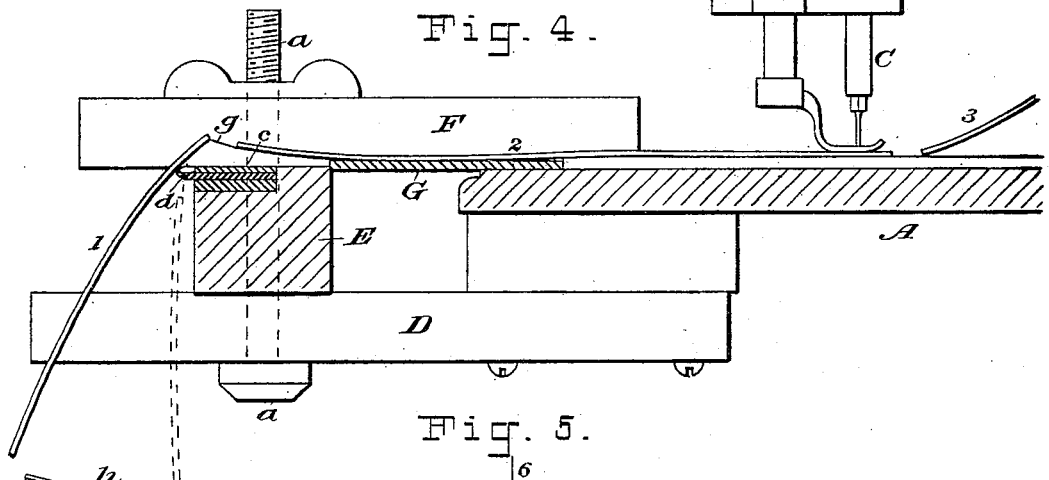
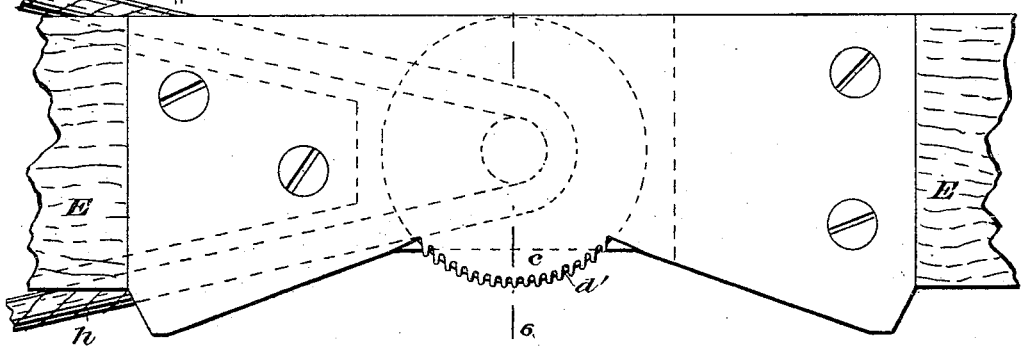
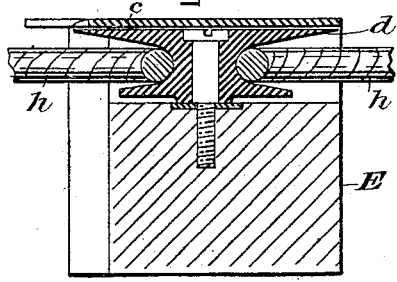
WITNESSES:
INVENTOR:
James H. Foote
By his Attorneys,

UNITED STATES PATENT OFFICE.

JAMES H. FOOTE, OF NEW YORK, N. Y.

THREAD-CUTTING ATTACHMENT FOR SEWING-MACHINES.

SPECIFICATION forming part of Letters Patent No. 265,313, dated October 3, 1882.

Application filed April 7, 1882. (No model.)

*To all whom it may concern:*

Be it known that I, JAMES H. FOOTE, a citizen of the United States, residing in the city, county, and State of New York, have invented certain new and useful Improvements in Thread-Cutting Attachments for Sewing-Machines, of which the following is a specification.

In sewing on a machine a succession of short lengths, sewing from one onto another, and leaving a short space between the separate lengths, it is desirable to provide automatic means for severing the link of thread that connects the separate lengths.

To accomplish this result is the purpose of my present invention, which is shown in the accompanying drawings, wherein—

Figure 1:
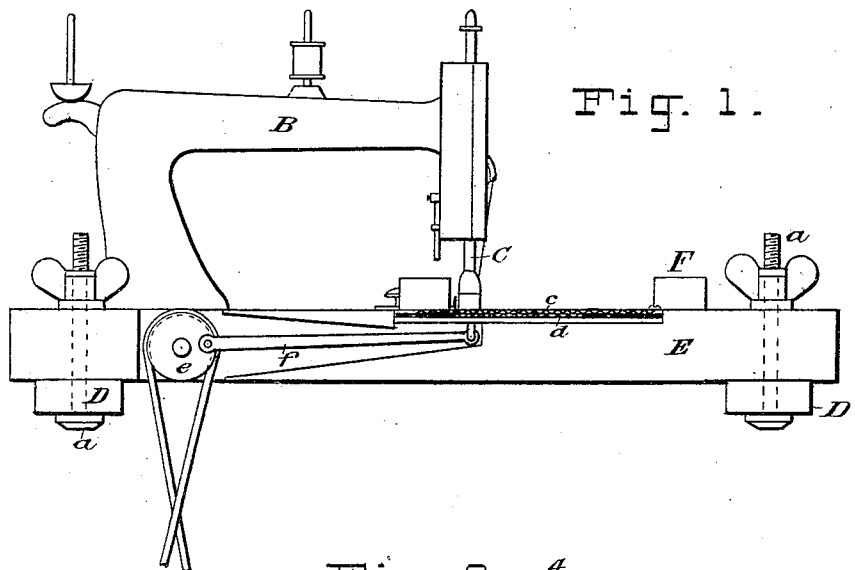
Figure 2:
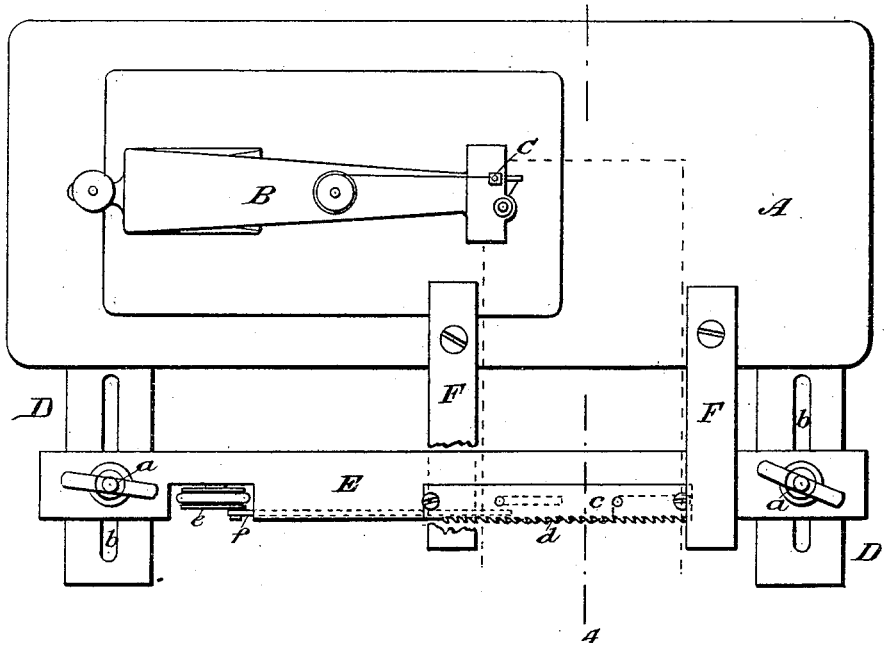

Figure 1 is a rear elevation of a sewing-machine to which my attachment has been applied. Fig. 2 is a plan thereof. Fig. 3 is an enlarged fragmentary plan, and Fig. 4 is an enlarged vertical cross-section on line 4 4 in Fig. 2. Figs. 5 and 6 show a modification, the former view being a fragmentary plan and the latter a vertical cross-section cut on the line 6 6.

Referring to Figs. 1 to 4, let A designate the table of the sewing-machine; B, the arm thereof, and C the needle or needle-bar.

To the table are fixed two bars, D D, which project backwardly, and on them is mounted a cross-bar, E, which stands parallel with the rear edge of the table A, and is adjustable toward or from the latter on the bars D D by being provided with clamps or set-screws $a\ a$, engaging slots $b\ b$ in said bars.

On the bar E is mounted the thread-cutting device, which in this form of my invention consists of two saws, one reciprocating rapidly and the other stationary. The upper saw or finger plate is lettered $c$, and the lower or cutting saw is lettered $d$, both being best shown in Fig. 3. The teeth on the plate $c$ are or should be rounded, as shown, (though this is not essential to the operation of the cutter,) and are inclined or pointed in a direction opposite to that of the teeth of the saw $d$. The teeth of both saws or plates project beyond the back edge of the bar E, as shown in Fig. 4. Any suitable means may be provided for rapidly reciprocating the saw $d$, that shown in Figs. 1 and 2 being a pulley, $e$, driven by a belt from the counter-shaft near the floor, which drives the machine, and bearing on its face a crank-pin, which communicates through a pitman, $f$, with the saw $d$.

My invention is especially designed to cut apart pamphlets whose leaves are joined by sewing along the back edge or fold, and I will describe its operation as applied to such pamphlets, three of which are shown in edge view in Fig. 4, and marked 1, 2, and 3. As each pamphlet is sewed the next is fed to the needle, so that the two are connected only by a link of thread, $g$, and the completed one is then pushed back by the one which is being sewed until it falls over the bar E. As shown, pamphlet 1 is falling over this bar and pamphlet 2 is nearly sewed. Pamphlet 1 lies across the points of the teeth on the plate $c$, so that it is prevented from coming against the saw $d$; but when it moves a little farther and falls into the position shown in dotted lines its thread $g$ is drawn in between two of the teeth of the plate $c$ and is severed by the saw $d$. This operation is repeated as each pamphlet falls over the bar E, and thus the thread is automatically severed without injury to the pamphlet. The action will be substantially the same with collars, cuffs, shoe-uppers, and many other things that are commonly sewed in the manner described.

In Figs. 5 and 6 a revolving knife-wheel, $d'$, is shown in place of the saw, the plate $c$ being shaped to conform thereto. The teeth on the plate are here shown as being straight, similar to the fingers on a reaper-bar, and their purpose is somewhat the same—that of holding the substance to be cut. The wheel-knife $d'$ may be revolved by means of a belt, $h$, or by other means. I do not regard this modification as being as desirable a form of my invention as that shown in Figs. 1 to 4, owing to the disadvantage of the pamphlets falling necessarily over a curved plate, whereas it is desirable that they shall fall over a straight edge or corner.

Numerous other modifications of my invention will readily suggest themselves, such as the use of a straight reciprocating knife or a circular saw, or of a fixed knife or saw and a reciprocating plate, $c$; and hence I do not confine myself to any special form or construction.

The adjustability of the bar E is desirable to accommodate pamphlets of different lengths. Where the pamphlets are to be always of the same length a table, A, might extend back the requisite distance and the cutter be set in it. In such case the back edge or portion of the table will constitute the bar E or be the equivalent thereof, and my use of the word "bar" in the claims must be understood as including such equivalent. F F are two guiding-bars, fastened by clamps so as to be laterally adjustable, their function being to guide the pamphlets as they are fed back to the cutter. G in Fig. 4 is a piece of board or sheet metal forming a bridge between the table A and bar E to keep the pamphlets from falling between the two. These auxiliaries may be used or not, as occasion requires.

I claim as my invention—

1. The combination, with a sewing-machine, of a bar arranged behind the needle, a guard-plate arranged on said bar and having a toothed edge overhanging the back edge thereof, and a cutting plate or blade arranged close beneath said guard-plate and capable of movement relatively to said plate, substantially as set forth.

2. The combination, with a sewing-machine, of a bar, E, a guard-plate, c, fixed on said bar and having a toothed edge overhanging the rear edge thereof, with a moving cutting-plate, d, mounted immediately beneath said plate, with its cutting-edge beneath the teeth in said plate, substantially as set forth.

3. The combination, with a sewing-machine, of bar E, toothed plate c, fixed thereto, and saw d, arranged beneath said plate and capable of a reciprocating motion, substantially as set forth.

4. The combination, with a sewing-machine, of a bar, E, arranged behind the same and adjustable toward or from the same at will, and cutting mechanism mounted on said bar at the rear upper corner thereof, substantially as set forth.

5. The combination, with a sewing-machine, of fixed bars D D, adjustable bar E, clamps a a, and cutting mechanism c d, substantially as set forth.

In witness whereof I have hereunto signed my name in the presence of two subscribing witnesses.

JAMES H. FOOTE.

Witnesses:
ARTHUR C. FRASER,
HENRY CONNETT.